United States Patent [19]
Shacklette et al.

[11] Patent Number: 5,911,918
[45] Date of Patent: Jun. 15, 1999

[54] SURFACE DOPANTS AS BLEND COMPATIBILIZERS IN CONJUGATED POLYMERS

[75] Inventors: Lawrence W. Shacklette, Maplewood, N.J.; Granville G. Miller, Birmingham, Ala.; Chien-Chung Han, Madison, N.J.; Ronald L. Elsenbaumer, Arlington, Tex.

[73] Assignee: Monsanto Company, St. Louis, Mo.

[21] Appl. No.: 08/996,925

[22] Filed: Dec. 23, 1997

Related U.S. Application Data

[63] Continuation of application No. 08/674,928, Jul. 3, 1996, abandoned, which is a continuation of application No. 08/089,465, Jul. 12, 1993, abandoned, which is a continuation-in-part of application No. 07/893,153, Jun. 3, 1992, abandoned.

[51] Int. Cl.⁶ .............................. H01B 1/12; H01B 1/20; B32B 5/16
[52] U.S. Cl. ........................... 252/500; 428/402; 428/407
[58] Field of Search ........................... 252/500; 528/210, 528/422; 428/402, 407

[56] References Cited

U.S. PATENT DOCUMENTS

| | | | |
|---|---|---|---|
| 3,963,498 | 6/1976 | Trevoy | 430/631 |
| 4,025,463 | 5/1977 | Trevoy | 252/500 |
| 4,521,589 | 6/1985 | Yamamoto et al. | 252/511 X |
| 4,601,849 | 7/1986 | Yata | 252/500 |
| 4,615,960 | 10/1986 | Yata | 252/500 X |
| 4,628,015 | 12/1986 | Yata et al. | 429/194 |
| 4,711,742 | 12/1987 | Jen et al. | 252/500 |
| 4,753,717 | 6/1988 | Yata et al. | 252/500 X |
| 4,798,685 | 1/1989 | Yaniger | 252/500 |
| 4,806,271 | 2/1989 | Yaniger et al. | 252/500 |
| 4,808,681 | 2/1989 | Harper et al. | 252/500 X |
| 4,822,638 | 4/1989 | Yaniger | 252/500 X |
| 4,847,115 | 7/1989 | Warren et al. | 252/500 X |
| 4,851,487 | 7/1989 | Yaniger et al. | 252/500 X |
| 4,855,361 | 8/1989 | Yaniger et al. | 252/500 X |
| 4,900,782 | 2/1990 | Han et al. | 525/398 |
| 4,940,517 | 7/1990 | Wei | 528/422 X |
| 4,940,640 | 7/1990 | MacDiarmid | 429/213 |
| 4,959,180 | 9/1990 | Armes et al. | 252/519 |
| 4,983,322 | 1/1991 | Elsenbaumer | 252/500 |
| 5,028,481 | 7/1991 | Stramel | 428/402 X |
| 5,061,401 | 10/1991 | Wernet et al. | 252/500 |
| 5,066,278 | 11/1991 | Hirschberg et al. | 604/256 |
| 5,068,060 | 11/1991 | Jen et al. | 252/500 |
| 5,069,820 | 12/1991 | Jen et al. | 252/500 |

(List continued on next page.)

FOREIGN PATENT DOCUMENTS

| | | |
|---|---|---|
| 0017717 | 10/1980 | European Pat. Off. . |
| WO8901694 | 2/1989 | European Pat. Off. . |
| WO9010297 | 9/1990 | European Pat. Off. . |
| 92/18988 | 10/1992 | WIPO . |

OTHER PUBLICATIONS

L.W. Shacklette, et al., "Structure and Properties of Polyaniline . . . ", J. Chem. Phys. 88, (Mar. 15, 1988) vol. 88, pp. 3955–3961.

T. Kobayashi, et al., "Electrochemical Reactions Concerned With . . . ", J. Electroanal. Chem., (1984), vol. 177, pp. 281–291. Month not known.

A.G. Green et al., "Aniline–Black and Allied Compounds", Part II, (1912), v101–T1, pp. 1117–1123. Month Not Known.

*Primary Examiner*—Mark Kopec
*Attorney, Agent, or Firm*—Howell & Haferkamp, L.C.

[57] ABSTRACT

An electrically conductive conjugated polymer particle comprising an ionized electrically conductive substituted or unsubstituted conjugated polymer doped with one or more dopant solutes having one or more anionic moieties at least one of said dopants predominating at or near the surface of said particle having at least one aliphatic chain of at least 3 carbon atoms wherein the sum of such chains contain at least 12 aliphatic carbon atoms when an anionic functionality is bonded directly to an aromatic moiety and at least about 6 carbon atoms when the anionic functionality is bonded directly to an aliphatic moiety.

20 Claims, 1 Drawing Sheet

U.S. PATENT DOCUMENTS

| | | | |
|---|---|---|---|
| 5,130,886 | 7/1992 | Kishimoto et al. | 252/500 X |
| 5,134,177 | 7/1992 | Aklonis et al. | 252/500 X |
| 5,160,457 | 11/1992 | Eisenbaumer | 252/500 |
| 5,171,478 | 12/1992 | Han | 252/500 |
| 5,176,851 | 1/1993 | Barry | 252/500 |
| 5,188,766 | 2/1993 | Eiffler | 252/500 |
| 5,281,363 | 1/1994 | Shacklette et al. | 252/500 X |
| 5,378,404 | 1/1995 | Han et al. | 252/500 |
| 5,648,416 | 7/1997 | Miller et al. | 524/500 |

SURFACE DOPANTS AS BLEND COMPATIBILIZERS IN CONJUGATED POLYMERS

RELATED APPLICATION

This application is a continuation of Ser. No. 08/674,928, filed Jul. 3, 1996 now abandoned, which is a continuation of Ser. No. 08/089,465, filed Jul. 12, 1993, now abandoned, which was a continuation-in-part of Ser. No. 07/893,153, filed Jun. 3, 1992, now abandoned.

BACKGROUND OF THE INVENTION

1. Field of the Invention

This invention relates to novel electrically conductive conjugated polymers such as polyaniline. Another aspect of this invention relates to articles formed from conjugated polymers such as polyaniline articles, including films, inks, printing, parts, fibers, coatings and the like formed from the polymer compositions of this invention.

2. Description of the Prior Art

There has recently been an increased interest in the electrochemistry and electrical phenomena of polymeric systems. Recently, work has intensified with polymers having extended conjugation in at least one backbone chain such as a polyaniline. See for example, EP 0017717; U.S. Pat. Nos. 3,963,498, 4,025,463, 4,855,361, 4,806,271, 4,822,638, 4,851,487, 4,798,685, 5,006,278, 5,069,820 and 5,061,401; and WO89/01694 and WO90110297.

SUMMARY OF THE INVENTION

This invention relates to electrically conductive particle(s) comprising an ionized electrically conductive conjugated polymer (polymer cation) doped with one or more dopant solutes (anions) having one or more anionic moieties, and comprising at least one aliphatic dopant solute at or near the surface of said particle selected from the group consisting of aliphatic and aromatic/aliphatic organic species comprising one or more aliphatic moieties having at least three carbon atoms which are not substituted by an anionic moiety at more than one position, wherein the sum of such aliphatic moieties is such that when said species comprises an aromatic moiety having at least one anionic moiety substituted thereto, the species includes at least 12 aliphatic carbon atoms, and when said species comprises an aliphatic moiety having an anionic moiety substituted thereto and no aromatic moiety substituted with anionic moieties the species includes more than about six carbon atoms and preferably comprising at least one other dopant solute at or near the core of said particles forming a skin\core type structure.

As used herein, an "organic species" is a species which comprises hydrogen and carbon atoms and which may also contain other types of atoms such as halogen, oxygen, nitrogen, sulfur, selenium, phosphorous, boron and the like. As used herein, "at or near the surface of the particle" is all or a portion of the surface of said particles to a depth of about 5 nanometers (nm); and "at or near the core of said particle" is all or a portion of the particle more than about 5 nanometers (nm) from the surface of the particle; "anionic moieties" are moieties having at least one negative charge; "aliphatic organic species" are organic species which include aliphatic groups such as alkyl, alkoxyalkyl, alkenyl, alkynyl, alkanoyl, alkylsulfonylalkyl, and the like; and "aliphatic/aromatic organic species" are organic species which include aromatic and aliphatic species such as alkylphenyl, phenyl, naphthyl, alkoxyphenyl, phenylalkyl and the like.

Another aspect of this invention relates to a polymer blend comprising a matrix which comprises one or more thermosetting polymers, one or more thermoplastic polymers or blends thereof having dispersed therein an electrically conductive effective amount of electrically conductive particles comprising an ionized electrically conductive conjugated polymer (polymer cation) doped with one or more dopant solutes (anion) having one or more anionic moieties and comprising at least one aliphatic dopant solute at or near the surface of said particle which is derived from a dopant selected from the group consisting of aliphatic and aromatic/aliphatic organic species comprising one or more aliphatic moiety having at least three carbon atoms which are not substituted by an anionic moiety at more than one position, wherein the sum of such aliphatic moieties is such that when the species comprises an aromatic moiety substituted with at least one anionic moiety the species includes at least 12 aliphatic carbon atoms, and when the species comprises one or more aliphatic moieties substituted with at least one anionic moiety but no aromatic moiety substituted with an anionic moiety the species includes more than about six carbon atoms (preferably comprising at least one other other dopant solute at or near the core of said particles), wherein at least about 10% of said particles in said blend are dispersed in said matrix at a particle size equal to or less than about 400 nm.

Several advantages flow from this invention. For example, the surface dopant enhances the dispersion ability of doped conjugated polymer particles in a matrix polymer. This embodiment of the invention includes polyaniline particles doped in the skin or surface region of the particle with a dopant which has a compatible surface energy with the intended matrix polymer or polymers of the blend.

Another advantage of this invention is the ease with which agglomerates or aggregates of conjugated polymer particles can be broken down during the dispersion process such as shear mixing, rolling, milling, extruding, or ultrasonification. Since doped conjugated polymer is highly charged and highly polar, particles tend to strongly aggregate due to coulombic or dipolar interactions. The use of surface dopants containing aliphatic carbon atoms reduces the charge density at the surface of said conjugated polymer paticles and thereby renders aggregates easier to breakdown and disperse to the desired particle size.

BRIEF DESCRIPTION OF THE DRAWINGS

The invention will be more fully understood and further advantages will become apparent when reference is made to the following detailed description of the invention and the accompanying drawings in which.

DESCRIPTION OF THE PREFERRED EMBODIMENTS

Figure 1:
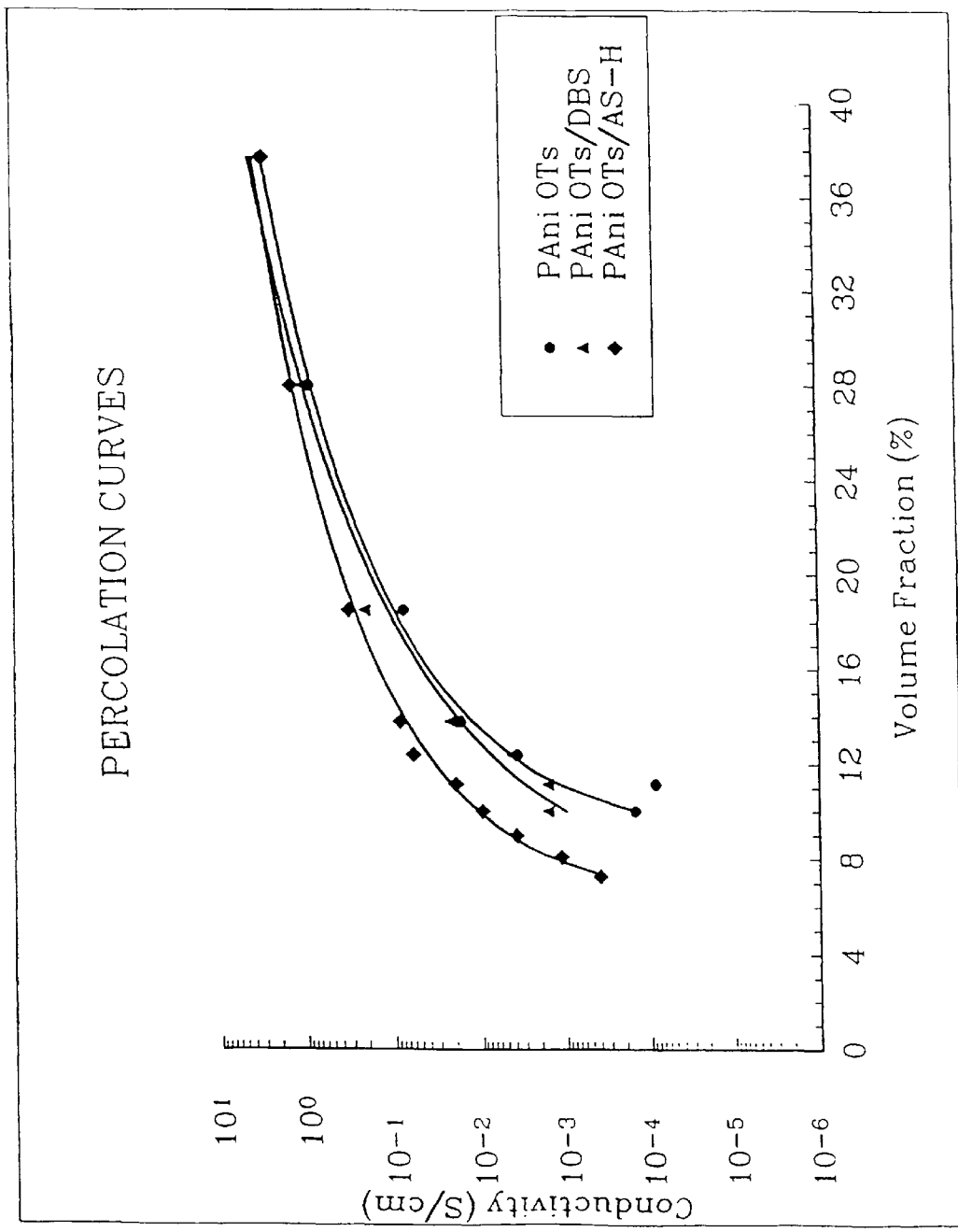
FIG. 1 is a percolation graph of conductivity versus volume fraction loading (in percent) of polyaniline particles in an insulating matrix polymer, poly(ethylene terephthalate gycol).

This invention is directed to particles of an ionized, electrically conductive conjugated polymer (polymer cation) doped with one or more dopant solutes(anions) wherein the region at or near the surface of the particles comprises a dopant solute selected from the group consisting of aliphatic dopant solutes. Particle size and shape are not critical. For example, the particles can be of an irregular shape or can be of a regular or substantially regular shape. The particles can be regular flat-shaped or needle-shaped particles having relatively high aspect ratios or can be short block, spherical, oval or like shaped particles having relatively low aspect ratios. In any event, the shape of the particles will be dictated solely by the needs of the specific application. Particle size may also vary widely and is dependent on the particular application. In those applications where relatively large particles are required, i.e., 51 to 100 microns, large particles are used. Conversely in those applications where relatively small particles are required i.e. less than about one micron, small particles are used. Although not critical, preferred particle size is from about 0.02 to about 50 microns and more preferred particle sizes are from about 0.02 to about 3 microns. It is most preferred that the primary particles themselves be doped in a skin/core configuration and that the primary particles range in size from about 0.05 to 0.2 microns.

In some conjugated polymer compositions, particles may exist as aggregates composed of smaller primary particles. It is generally most preferred for the production of uniform blends of high conductivity that these aggregates be broken down to their primary particles during compounding.

Conjugated polymers for use in the process of this invention may vary widely. As used herein "conjugated polymers" are homopolymers or copolymers which are comprised of alternating carbon-carbon double bonds (either singly or as part of an aromatic ring structure), and optionally heteroatoms such as oxygen, nitrogen, sulfur, selenium, phosphorous and the like along the polymer conjugated backbone or conjugated side chains thereof, and can be rendered to an electrically conductive state (equal to or greater than about $10^{-9}$ S/cm as determined by the four-in-line probe method described in "Laboratory Notes on Electrical and. Galvanometric Measurements" by H. H. Wieder, Elsevier Scientific Publishing Co., New York, N.Y., 1979) by doping with some dopants known in the art.

Illustrative of such polymers are poly(unsaturated) polymers such as substituted and unsubstituted polyacetylene; substituted or unsubstituted poly(heteroaromatics), such as poly(thienylenes), poly(pyrroles), poly(quinolines), poly (isothianaphthenes), poly(carbazoles), poly(alkyl thiophenes) and the like; substituted or unsubstituted poly (aromatics) such as poly(phenylene sulfides), poly(anilines), poly(phenylenes), poly(naphthalenes), poly(naphthols), and poly(perinaphthalenes); poly (benzoquinones); poly (azulenes); and substituted or unsubstituted poly(aromatic vinylenes) such as poly(phenylene vinylenes), poly (dimethoxyphenylene vinylenes), poly(naphthalene vinylenes) and the like; and substituted or unsubstituted poly(heteroaromatic vinylenes) such as poly(thienylene vinylenes), poly(furylene vinylenes), poly(carbazole vinylenes), poly(pyrrole vinylenes) and the like.

Preferred conjugated homopolymers or copolymers are "conjugated backbone homopolymers or copolymers". As used herein, "conjugated backbone homopolymers or copolymers" are conjugated homopolymers or copolymers in which all or substantially all of the conjugation is in the main backbone of the homopolymer or copolymer.

Preferred conjugated homopolymer or copolymers are substituted or unsubstituted polyanilines, poly (heterocycles), and aromatic or heteroaromatic vinylenes. Illustrative of preferred homopolymers or copolymers of poly(heterocycles), and aromatic or hetero aromatic vinylenes are those described in more detail in U.S. Pat. Nos. 4,711,742 and 5,068,060 and PCT/W088/00954. More preferred for the practice of this invention are conjugated polymers which have relatively low acidity (pKa>2, preferably >4 and most preferably >6) and which are readily doped by protonic acids as for example, polyaniline, poly (benzoquinone), polypyrrole, and poly(carbazole).

More preferred conjugated backbone homopolymers or copolymers are poly(anilines) and poly pyrroles. Most preferred polymers are polyanilines. As used herein, "poly (anilines)" are homopolymers or copolymers in which the recurring backbone monomeric units are selected from the group consisting of substituted or unsubstituted phenyl rings and amine linkages (—NH— or —NR— where R is a substituent other than hydrogen) which may contain varying amounts of substituted or unsubstituted quinoid rings and imine (—N=) linkages. As used herein, "neutral or undoped polyaniline" is characterized by an uncharged backbone, "polyaniline base" is a particular form of undoped polyaniline which contains at least one quinoid diimine linkage in the backbone and "electrically conductive or doped poly (aniline)" is characterized by a charged backbone which may be formed by a partial or complete protonation of the amine and/or imine nitrogen atoms. As used herein, "leuco polyaniline" is a neutral form of polyaniline which is in a reduced state (low oxidation state) and which comprises to a substantial degree phenyl rings linked by amine (—NH—) linkages. Such leuco-polyanilines are preferably doped with oxidizing dopants such as ferric salts.

Any form of such poly(anilines) can be conveniently used in the practice of this invention. Illustrative of useful forms are those described in Green, A. G. and Woodhead, A. E., "CXVII-Aniline-black and Allied Compounds, Part II", *J. Chem. Soc.,* 101 pp. 1117 (1912) and Kobayashi, et al., "Electrochemical Reactions . . . of Polyaniline Film-Coated Electrodes", *J. Electroanal. Chem.,* 177, pp. 281–91 (1984) and in Shacklette, L. W., et al. "Structure and Properties of Polyaniline as Modeled by Single-Crystal Oligomers", *J. Chem. Phys.* 88 P 3955 (1988), which are hereby incorporated by reference.

In the preferred embodiments of the invention, poly (anilines) for use in the invention are homopolymers and copolymers of the type derived from the polymerization of unsubstituted and substituted anilines of the Formula I:

FORMULA I

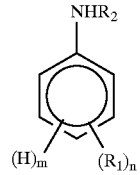

wherein:
n is an integer from 0 to 5;
m is an integer from 0 to 5, with the proviso that the sum of n and m is equal to 5 and with the further proviso that at least one position on the aniline ring, preferably at the para position, is substituted with a substituent which will allow coupling of the aniline units, such as halo, hydrogen or other leaving group;

$R_1$ is the same or different at each occurrence and is selected from the group consisting of alkyl, deuterium, alkenyl, alkoxy, cycloalkyl, cycloalkenyl, alkanoyl, alkylthio, aryloxy, alkylthioalkyl, alkylaryl, arylalkyl, amino, alkylamino, dialkylamino, arylamino, diarylamino, alkylarylamino, aryl, alkylsulfinyl, aryloxyalkyl, alkylsulfinylalkyl, alkoxyalkyl, alkylsulfonyl, arylthio, alkylsulfonylalkyl, boric acid or salts or esters thereof, phosphoric acid or salts or esters thereof, arylsulfinyl, alkoxycarbonyl, arylsulfonyl, carboxylic acid or salts or esters thereof, phosphonic acid or salts or esters thereof, halo, hydroxy, cyano, sulfinic acid or salts or esters thereof, phosphinic acid or salts or esters thereof, sulfonic acid or salts or esters thereof, nitro, alkylsilane, or any of the foregoing aryl, aliphatic or cycloaliphatic groups substituted with one or more phosphonic acid or salts or esters thereof, sulfonic acid or salts or esters thereof, phosphoric acid or salts or esters thereof, boric acid or salts or esters thereof, sulfinic acid or salts or esters thereof, phosphinic acid or salts or esters thereof, carboxylic acid or salts or esters thereof, halo, nitro, amino, alkylamino, dialkylamino, arylamino, diarylamino, alkylarylamino, cyano or epoxy moieties; or any two $R_1$ groups together or any $R_1$ group together with any $R_2$ group may form a substituted or unsubstituted alkylene, alkenylene or alkynylene chain completing a 3, 4, 5, 6, 7, 8, 9 or 10 membered aromatic, heteroaromatic, heteroalicyclic or alicyclic ring, which ring may optionally include one or more divalent nitrogen, sulfur, sulfinyl, or salts or esters thereof, carbonyl, sulfonyl, or oxygen atoms wherein permissible substituents are one or more phosphonic acid or salts or esters thereof, sulfonic acid or salts or esters thereof, phosphoric acid or salts or esters thereof, boric acid or salts or esters thereof, phosphinic acid or salts or esters thereof, carboxylic acid or salts or esters thereof, halo, nitro, amino, alkylamino, sulfinic acid or salts or esters thereof, dialkylamino, arylamino, diarylamino, alkylarylamino, cyano or epoxy moieties; or $R_1$ is an aliphatic moiety having repeat units of the formula:

$$-(OCH_2CH_2)_qO-CH_3, -(OCH_2CH(CH_3))_qO-CH_3,$$
$$-(CH_2)_qCF_3, -(CF_2)_q-CF_3 \text{ or } -(CH_2)_qCH_3$$

wherein q is a positive whole number; and $R_2$ is selected from the group consisting of permissible $R_1$ substituents and hydrogen.

Illustrative of useful $R_1$ groups are hydrogen, alkyl, such as methyl, ethyl, octyl, nonyl, tert-butyl, neopentyl, isopropyl, sec-butyl, dodecyl and the like, alkenyl such as 1-propenyl, 1-butenyl, 1-pentenyl, 1-hexenyl, 1-heptenyl, 1-octenyl and the like; alkoxy such as propoxy, butoxy, methoxy, isopropoxy, pentoxy, nonoxy, ethyoxy, octoxy, and the like; cycloalkenyl such as cyclohexenyl, cyclopentenyl and the like; alkanoyl such as butanoyl, pentanoyl, octanoyl, ethanoyl, propanoyl and the like; amino; alkylamino, such as methylamino, ethylamino, butylamino and the like; dialkylamino, such as dimethylamino, methylethylamino and the like; arylamino such as phenylamino, p-methylphenylamino and the like; diarylamino, such as diphenylamino, p-nitrophenyl-p'-methylphenylamino and the like; alkylarylamino, such as 2-phenyl-4-methylamino and the like; alkylsulfinyl, alkylsulfonyl, alkylthio, arylthio, arylsulfinyl, and arylsulfonyl such as butylthio, neopentylthio, methylsulfinyl, benzylsulfinyl, phenylsulfinyl, propylthio, octylthio, nonylsulfonyl, octylsulfonyl, methylthio, isopropylthio, phenylsulfonyl, methylsulfonyl, nonylthio, phenylthio, ethylthio, benzylthio, phenethylthio, sec-butylthio, naphthylthio and the like; alkoxycarbonyl such as methoxycarbonyl, ethoxycarbonyl, butoxycarbonyl and the like; cycloalkyl such as cyclohexyl, cyclopentyl, cyclo-octyl, cycloheptyl and the like; alkoxyalkyl such as methoxy-methyl, ethoxymethyl, butoxymethyl, propoxyethyl, pentoxybutyl and the like; aryloxyalkyl and aryloxyaryl such as phenoxyphenyl, phenoxymethyl and the like; and various substituted alkyl and aryl groups such as 1-hydroxybutyl, 1-aminobutyl, 1-hydroxypropyl, 1-hydroxypentyl, 1-hydroxyoctyl, 1-hydroxyethyl, 2-nitroethyl, trifluoromethyl, 3,4-epoxybutyl, cyanomethyl, 3-chloropropyl, 4-nitrophenyl, 3-cyanophenyl, and the like; acid and acid salts such as sulfonic acid, carboxylic acid and salts thereof; aliphatic or aryl groups substituted with an acid or salt thereof such as phosphonic acid, phosphinic acid, sulfonic acid, sulfinic acid, phosphoric acid, boric acid, or carboxylic acid groups such as ethylsulfonic acid, propylsulfonic acid, 4-nitrobenzene sulfonic acid, butylsulfonic acid, phenylsulfonic acid, and the like.

Also illustrative of useful $R_1$ groups are divalent moieties derived from any two $R_1$ groups or a $R_1$ group with a $R_2$ group such as moieties having from about 2 to about 7 repeat units of the formula:

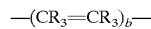

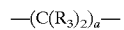

wherein $R_3$ is the same or different at each occurrence and is hydrogen or alkyl, as for example $-(CH_2)_4-$, $-(CH_2)_3-$, $-(CH=CH-CH=CH)-$, $-[CH_2-CH(CH_3)-CH_2]-$ and $-(CH_2)_5-$, and groups comprised of such moieties which include one or more heteroatoms of oxygen, nitrogen, ester, sulfonyl, carbonyl, sulfinyl, and/or sulfur, such as $-CH_2SCH_2-$ $-CH_2NHCH_2-$, $-SCH_2NHCH_2-$, $-O-CH_2-CH_2O-$ $-O-CH_2-S-CH_2-$, $-CH_2S(O_2)CH_2-$, $-CH_2S(O)CH_2-$, $-OC(O)CH_2CH_2-$, $-CH_2C(O)CH_2-$ and $-CH_2-O-CH_2-$ to form heterocyclic amino compounds such as tetrahydronaphthylamine, dihydrobenzopyrroleamine, benzofuranamine, dihydrobenzopyranamine, dihydrobenzofuranamine, dihydrobenzoparaoxazineamine, dihydrobenzoparadiazineamine, dihydrobenzotriazoleamine, dihydro-benzothiazineamine, benzothiopyranamine, dihydro-benzoxazoleamine and the like. Exemplary of useful $R_3$ groups are divalent alkenylene chains containing 1 to about 3 unsaturated bonds such as divalent 1,3-butadiene and like moieties which may also include one or more divalent oxygen, nitrogen, sulfinyl, sulfonyl, carbonyl, ester, and/or sulfur groups which form such compounds as benzodiazineamine, benzodiazoleamine, benzotriazepine-amine, benzimidazolylamine, benzisoxazoleamine, benzoxazolylamine, benzothiazineamine, benzoxazineamine, naphthaleneamine, benzopyranamine, benzothiazineamine, anthraceneamine, aminobenzothiopyran, aminobenzodiazine, benzthiopyrone amine, aminocoumarin, benzthiopheneamine, benzothiodiazoleamine, and the like.

Exemplary of useful $R_2$ groups are hydrogen and the above-referenced representative $R_1$ groups described above such as alkyl as for example, methyl, ethyl, isopropyl, butyl, isobutyl, hexyl, octyl and the like; alkylsulfonyl such as methylsulfonyl, ethylsufonyl, propylsulfonyl and the like; arylsulfonyl such as phenylsulfonyl, p-methyl phenylsulfonyl, naphthylsulfonyl and the like.

Preferred polyaniline consists of repeat units of the Formulas II and/or III:

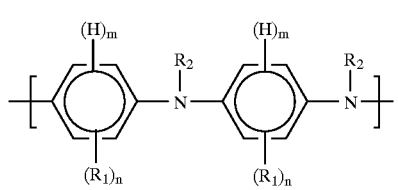

Formula II

-continued

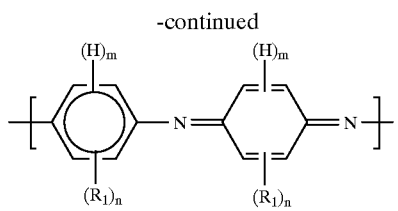

Formula III a combination thereof having various ratios of the above repeat units in the polyaniline backbone such as leucoemeraldine, protoemeraldine, emeraldine, nigraniline and pernigraniline. Poly(anilines) useful in the practice of this invention are more preferably those of the Formula IV:

FORMULA IV

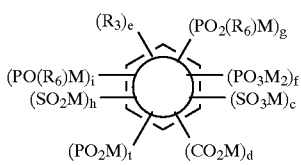

wherein:

n, m, $R_1$ and $R_2$ are as described above;

x and y are the same or different at each occurrence and are integers equal to or greater than 0, with the proviso than the sum of x and y is greater than 0, preferably where x is an integer equal to or greater than 0 and/or that the ratio of x to y is greater than or equal to about 0, more preferably said ratio is equal to or greater than 0.5 and most preferably said ratio is equal to or greater than about 1; and z is the same or different at each occurrence and is an integer equal to or greater than about 5.

Preferred for use in the practice of this invention are poly(anilines) of the above Formula IV in which:

n is an integer from 0 or 1;

m is an integer from 3 or 4, with the proviso that the sum of n and m is equal to 4;

$R_1$ is phenyl, or alkyl or alkoxy having from 1 to about 12 carbon atoms, a protonic acid function or a salt or ester thereof, or alkyl, phenyl or alkoxy substituted with one more or protonic acids or salts or esters thereof;

x is an integer equal to or greater than 1;

y is equal to or greater than 0, with the proviso that the ratio of x to y is equal to or greater than 0.5;

z is an integer equal to or greater than about 5;

Particularly preferred for use in the practice of this invention are poly(anilines) of the above Formula IV in which:

n is an integer from 0 or 1;

m is an integer from 3 or 4 with the proviso that the sum of n and m is equal to 4;

$R_1$ is alkyl, or alkoxy having from 1 to about 6 carbon carboxylic acid or salts or esters thereof, phosphinic acid or salts or esters thereof, sulfonic acid or salts or esters thereof, sulfinic acid or salts or esters thereof, phosphonic acid or salts or esters thereof, or alkyl or alkoxy substituted with phosphinic acid or salts or esters thereof, sulfinic acid or salts or esters thereof, halo, phosphonic acid or salts or esters thereof, phosphoric acid or salts or esters thereof, or sulfonic acid or salts or esters thereof;

x is an integer equal to or greater than 2; and y is equal to or greater than 0, with the proviso that the ratio of x to y is greater than about 1; and z is an integer equal to or greater than about 10.

Amongst the preferred embodiments, more preferred for use in the practice of this invention are poly(anilines) of the above Formula IV in which:

n is an integer from 0 or 1;

m is an integer from 3 or 4, with the proviso that the sum of n and m is equal to 4;

$R_1$ is alkoxy or alkyl of from 1 to about 6 carbon atoms (preferably from 1 to about 3 carbon atoms), sulfonic acid or salts thereof, phosphoric acid or salts thereof, or phosphonic acid or salts thereof;

x is an integer equal to or greater than 2; and y is an integer equal to or greater than 1; and z is an integer equal to or greater than about 10.

In the most preferred embodiment of the invention;

n is 0;

m is 4;

x is an integer equal to about 2;

y is an integer equal to about 1, with the proviso that the ratio of x to y is equal to or greater than about 2; and z is an integer equal to or greater than about 10.

In general, the number of conjugated homopolymer or copolymer repeat units are not critical and may vary widely. The greater the number of repeat units the greater the molecular weight of the conjugated homopolymer or copolymer and the greater the viscosity of solutions of the polymer. In the present application where conjugated homopolymers or copolymers of relatively high molecular weight and insolubility are required, then such materials can be used. The number of repeat units (z) is preferably at least about 10. The upper limit can vary widely depending on the desired molecular weight and viscosity and the required degree of processibility, such as melt processibility, solution processibility and the like. In the preferred embodiments of the invention, the number of repeat units is at least about 20, and in the particularly preferred embodiments, the number of repeat units is at least about 30. Amongst the particularly preferred embodiments, most preferred are those embodiments in which the number of repeat units is at least about 40.

Conjugated homopolymers and copolymers can be conveniently prepared through conventional procedures. Such procedures are well known in the art and will not be described herein in great detail. See for example U.S. Pat. Nos. 4,940,640; 4,711,742; 4,521,589; 4,808,681; 4,983,322; 5,006,278 and 4,900,782; PCT WO88/00954; and "The Handbood of Conducting Polymers", edited by Terje A. Skotheim, Marcell Decker, Inc., New York and Basel and references cited therein, all of which is hereby incorporated by reference. For example, preferred polyanilines can be prepared through use of chemical and electrochemical synthetic procedures. For example, one form of polyaniline can be prepared by treating aniline with ammonium persulfate $(NH_4)_2S_2O_8$ in excess 1M HCl. This powdered form of polyaniline is blue green in color. After methanol washing and air drying this material exhibits a conductivity of about 5 S/cm. This conductive form of polyaniline can be treated with ammonium hydroxide in ethanol to form a nonconductive form of polyaniline which is dark blue in color and which has a conductivity of less than $10^{-8}$ S/cm. Other chemical procedures for preparation of various chemical forms of polyaniline are described in detail in Green et al and U.S. Pat. Nos. 4,855,361, 4,798,685, 4,806,271, 4,822, 638, 4,851,487 and 4,940,517 described above.

Useful forms of conjugated polymers can also be prepared electrochemically. For example, useful forms of polyaniline can be prepared by the electrochemical oxidation of aniline in aqueous fluoroboric acid electrolyte on a platinum foil anode.

Other useful conjugated polymers can be prepared pyrolytically. For example, polyacene can be prepared by the pyrolysis of phenolic resins as described in greater detail in U.S. Pat. Nos. 4,615,960; 4,628,015; 4,601,849; and 4,753,717.

Other chemical and electrochemical syntheses and transformations of the conductive form of polyaniline may be discovered and are presently contemplated as being useful. Moreover, additional forms or types of polyaniline may be elucidated in the future. Accordingly, no limitation to the syntheses, transformation, or structures herein described or postulated is intended beyond the limitations of the appended claims.

The conjugated homopolymer or copolymer is doped with a suitable dopant solute to render the polymer electrically conductive. In general, such dopant solute is derived from a dopant compound, which upon addition to the conjugated polymer, introduces positive charge carriers onto the polymer backbone with co-committent formation of an anionic dopant solute species (dopant anion) to form a charge transfer complex with the polyaniline, which complex has an electrical conductivity equal to or greater than about $10^{-8}$ $ohm^{-1}cm^{-1}$ by the four-in-line probe method.

Any doping procedure may be used. Such methods are conventional and will not be described herein in any great detail. For example, the conjugated homopolymer or copolymer is best doped by contacting the dopant with the polymer for a time sufficient to dope to the desired extent. The polymer can be contacted with the dopant in the gaseous state, in the liquid state, neat, or diluted by some suitable dilutent such as a gas as for example air, or liquid such as water, or an organic liquid. The dopant can be contacted with the conjugated homopolymer or copolymer either during polymerization or after polymerization. In a preferred embodiment of the invention, the conjugated homopolymer or copolymer may be doped by carrying out the polymerization in the presence of an acid having a pKa in the solution equal to or less than that of the homopolymer or copolymer, or by subsequently treating the synthesized polymer with said acid. In general, the higher the pKa of the conjugated homopolymer or copolymer, the higher the acid pKa that can be used to provide a conductive polymer; and conversely, the lower the pKa of the conjugated polymer, the lower the pKa of the acid necessary to provide a desired degree of electrical conductivity. The pKa (or pH) of the acid is preferably equal to or less than about 5, more preferably equal to or less than about 4, and the most preferably equal to or less than about 3.

In another preferred embodiment of the invention, the conjugated copolymer or homopolymer can be doped after polymerization. For example, the conjugated homopolymer or copolymer is doped by contact with a solution of the dopant in a suitable solvent such as water.

Dopants for use in the practice of any specific embodiment of this invention may vary widely depending on a number of factors. For example, the particular dopant of choice will depend on the particular form of the undoped conjugated polymer. For example, if the polymer is initially in a reduced state (e.g. reduced polypyrrole or leucopolyaniline) then the dopant of choice would be an oxidizing dopant or combination of dopants. Alternatively, if the polymer is a base, as for example polyaniline base, then the preferred dopant would be an acid.

The dopant solute in the region at or near the surface of the particle is critical to the advantages of this invention, i.e. enhanced dispersibility in a polymer or liquid matrix. This dopant solute renders the surface of the particle "compatible" with the environment or matrix in which the particles will be dispersed and/or the conditions under which said particles will be dispersed. As used herein "compatibility" refers to meeting one or more of the following criteria: closely matching the surface energy at the interface of the particle and the matrix, obtaining low, chemical reactivity between the particle and the matrix or other medium with which the particle will come in contact and maximizing dispersive, polar or hydrogen bonding interactions which will lead to the facile dispersion of the particles in the matrix.

The particle may be doped with a single dopant solute or two or more dopant solutes either in mixtures or in layers. When two or more dopants are employed, it is generally preferred that at least one dopant solute at or near the surface renders the surface of the particle compatible with the matrix and that at least one dopant solute at or near the core of the particle renders that region more electrically conductive than the region at or near the surface of the particle. The dopant within the core can be "incompatible" with the environment to which the particle is subjected or it can be adversely affected by such environment (reduction in beneficial properties). As used herein, "incompatible" refers to having a widely mismatched surface energy or a high chemical reactivity toward the matrix or the environment in which the particle is embedded or exposed.

A critical requirement of this invention is that the region of the particle at are near its surface comprises one or more dopant solutes at least one of which is an aliphatic dopant solute derived from dopant selected from the group consisting of aliphatic or aliphatic/aromatic organic species which on doping the particle forms a dopant solute having one or more anionic functionalities and having one or more aliphatic moieties having at least three carbon atoms which are not substituted with an anionic functionality at more than one position, wherein the sum of such aliphatic moieties is such that the dopant solute includes at least 12 aliphatic carbon atoms when the solute includes an aromatic moiety which is substituted with an anionic functionality, and includes more than about six aliphatic carbon atoms when the solute includes no aromatic moieties substituted with an anionic functionality. Aliphatic moieties may vary widely and include those consisting only of carbon and hydrogen, such cycloalkyl, cycloalkenyl, alkyl, alkylene, alkynylene, alkynyl, alkenyl and alkenylene groups and polymeric moieties such as polyolefins. Useful aliphatic moieties also include those which include one or more heteroatoms or functional groups such as —O—, —S(O)$_2$—, —S—, —S$_2$—, —C(O)—, —NH—, —N(H)C(O)—, —OC(O), —C(O)NH— and —N=N— as for example, alkoxy, alkanoyl, alkylamino, dialkylamino, alkylcarbonylalkylene, aminoalkyl, alkylthio, alkylsulfinyl, alkylcarbonylalkyl, poly(alkylene oxide), alkoxyalkyl, alkylthioalkyl, alkylsulfinylalkyl, alkylsulfonylalkyl, alkanoyloxyalkyl, alkylcarbonylalkyl, alkoxycarbonylalkyl, alkylaminocarbonylalkyl, alkanoylaminoalkyl and polymeric moieties such as polyesters, polyamides, polyethers, polycarbonates and the like.

The molecular weight of the organic species is not critical and may very widely. The molecular weight of the species is preferably equal to or less than about 2000, more preferably equal to or less than about 1000 and most preferably equal to or less than about 500.

Useful dopants for use in doping the particle at or near its surface may vary widely, the only requirement is that the dopant includes the critical number of aliphatic carbon atoms. Such useful dopants include oxidizing dopants. Illustrative of useful oxidizing dopants are $NO_2^+$ and Fe(III) salts such as those of the formula: $NO_2R_7SO_3$, $NO_2R_7CO_2$, $NO_2R_7SO_2$, $Fe(R_7SO_2)_3$, $Fe(R_7SO_3)_3$ and $Fe(R_7CO_2)_3$ (which give rise to doped polymers having dopant solutes of the formula $R_7SO_2^-$, $R_7SO_3^-$ and $R_7CO_2^-$) wherein $R_7$ is an organic radical having the required number of aliphatic carbon atoms. In the preferred embodiments of the invention the dopant used to dope the particle at or near its surface is an organic protonic acid where the anionic functionalities of the dopant solute are derived from the acid groups. The acid functionality of the dopant may vary widely. The only requirement is that the acid is capable of partially or completely protonating the conjugated polymer to form a charge-tranfer complex of the positively charged prontonated polymer and the acid. For example, in the case of polyaniline, the acid should be capable of protonating the nitrogen of the amine linkage, imine linkage or a combination thereof. This can usually be accomplished when the pKa of the acid function is less than that of the conjugated polymer in the doping medium. In the case of polyaniline, acids having a pKa of less than about 5 are preferably used. Such acid functionalities include but are not limited to sulfur or phosphorus acid functionalities such as sulfonic acid functionalities, sulfinic acid functionalities, sulfuric acid functionalities, phosphonic acid functionalities, phosphinic acid functionalities, and the like. Preferred acid functionalities are sulfur acid functions, more preferred acid functionalities are sulfinic and sulfonic acid functionalities, and most preferred acid functionalities are sulfonic acid functionalities.

Preferred for use in the practice of this invention for doping the particle at or near the surface of the particles are dopant solutes of the formulas:

$$R_4(PO_3^-)_t(PO_2^-)_t(SO_2^-)_t(PO_2(R_6)^-)_t(SO_3^-)_t(CO_2^-)_t(PO(R_6)^-)_t(BO_2^-)_r$$

and having a cationic moiety or moieties of the Formula:

$$M^{+n}$$

wherein at least one of the cationic moieties of the formula $M^{+8}$ is a proton or is a moiety which can be transformed into a proton under use conditions;

$M^{+8}$ is a cationic species having a positive charge n;

n is an integer equal to or greater than 1, preferably from 1 to about 8;

$R_4$ is an organic radicals, with the proviso that the total number of aliphatic carbon atoms included in $R_4$ is equal to or greater than twelve when $R_4$ is a moiety in which the anionic moiety is directly bonded to the aromatic group and is greater than about six when $R_4$ is a moiety in which the anionic moiety is bonded directly to an aliphatic moiety and there are no anionic moieties bonded to an aromatic moiety, and with the further proviso that $R_4$ includes at least one aliphatic moiety of at least three carbon atoms having an anionic moiety bonded to no more than one position; and r is an integer equal to or greater than 1, preferably from 1 to about 8; and $R_6$ is hydrogen, alkyl, aryl, alkylaryl, aryloxy, arylalkoxy, alkylsulfinyl, alkylthio, alkylsulfonyl or alkoxy.

More preferred for use in the practice of this invention as dopant solutes at or near the surface of the particle are those derived from acid dopants of the formula:

$$R_4(PO_2(R_6)M)_g(PO_3M_2)_f(SO_3M)_c(CO_2M)_d(PO_2M_2)_h(SO_2M)_h(PO(R_6)M)_i$$

or $$(R_3)_e, (PO_2(R_6)M)_g, (PO(R_6)M)_i, (PO_3M_2)_f, (SO_2M)_h, (SO_3M)_c, (PO_2M)_t, (CO_2M)_d$$

wherein:

M is $H^+$, or other metal or non-metal cation with the proviso that at least one of M is $H^+$ or a moiety which can be thermally or chemically transformed into a proton under use conditions, such as $NH_4^+$, $N(CH_3)_2H_2^+$, $PhS^+$, $N(C_2H_5)H_3^+$ and the like;

t is 0, 1, 2, 3 or 4;
h is 0, 1, 2, 3 or 4;
i is 0, 1, 2, 3 or 4;
c is 0, 1, 2, 3 or 4;
d is 0, 1, 2, 3 or 4;
f is 0, 1, 2, 3 or 4;
g is 0, 1, 2, 3 or 4, with the proviso that at least one of c, d, f, g, h, i or t is other than 0;
e is 0, 1 or 2; and $R_4$ is alkyl or alkyl substituted with one or more aryl, alkythio, alkoxycarbonyl, alkylcarbonyl, alkylcarbonylalkyl, alkylsulfinylalkyl, alkylsulfonylalkyl, alkylaminoalkyl, alkylamino, dialkylamino, alkylarylamino, (alkyl)arylamino, di(alkyl)arylamino, alkylaryl, alkylthioalkyl, alkylarylamino, alkoxy, alkoxyalkyl, alkylaryl, alkylsulfinyl, alkylsulfonyl, dialkylaminoalkyl, aryloxyalkyl, aryloxyalkoxy, alkoxyaryl, alkylaryloxy or alkoxyaryloxy with the proviso that the total number of aliphatic carbon atoms included in $R_4$ is more than about six carbon atoms and with the further proviso that $R_4$ includes at least one aliphatic moiety which includes at least four aliphatic carbons having an anionic moiety bonded to no more than one position;

$R_5$ is the same or different at each occurrence and are substituted or unsubstituted alkyl, alkoxycarbonyl, alkylcarbonyl, alkylcarbonylalkyl, alkylsulfinylalkyl, alkylsulfonylalkyl, alkylaminoalkyl, alkylamino, dialkylamino, alkylarylamino, (alkyl)arylamino, di(alkyl)arylamino, alkylaryl, alkylthioalkyl, alkylarylamino, alkoxy, alkoxyalkyl, alkylaryl, alkylsulfinyl, alkylthio, alkysulfonyl, dialkylaminoalkyl, aryloxyalkyl, aryloxyalkoxy, alkoxyaryl, alkylaryloxy or alkoxyaryloxy wherein permissible substituents include sulfonic acid or a salt or ester thereof, sulfinic acid or a salt or ester therof, phosphonic acid or a salt or ester thereof, phosphinic acid or a salt or ester thereof, phosphoric acid or a salt or ester thereof, carboxylic acid or a salt or ester thereof, boric acid or a salt or ester thereof, perhaloalkyl, phenyl, alkoxy, aryloxy, halo, cyano, amino, haloalkyl, hydroxy, nitro, and the like, or any two or more $R_5$ substituents together may form an alkylene or alkenylene chain completing a ring system such as a fused or spiro ring system which may include one or more cyclic rings, which chain may be unsubstituted or substituted with one or more halo, hydroxy, nitro, cyano, amino, alkylamino, dialkylamino, arylamino, diarylamino, alkylarylamino, or $R_4$ or $R_5$ is a moiety of the formula:

$$-(OCH_2CH_2)_qOCH_3 \text{ or } -(OCH_2CH(CH_3))_qOCH_3$$

wherein:

q is a positive whole number from 6 to about 12 or alkyl substituted with said moiety; with the provisio that the total number of aliphatic carbon atoms included in $R_5$ is greater than twelve and with the further proviso that includes at least one aliphatic moiety of at least four carbon atoms; and $R_6$ is hydrogen, alkyl, aryl, alkylaryl, aryloxy, arylalkoxy, alkylsulfinyl, alkylthio, alkylsulfonyl, or alkoxy.

In the particularly preferred embodiments of this invention, useful dopant solutes for doping the particle at or near its surface are derived from acid dopants of the above formula:

$$R_4(PO_2(R_6)M)_g(PO_3M_2)_f(SO_3M)_c(PO_2M_2)_t(SO_2M)_h(PO(R_6)M)_i$$
or

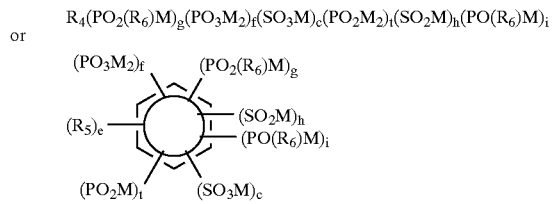

wherein:

c, t, f, g, h and i are the same or different at each occurrence and are 0, 1, 2, or 3, with the proviso that at least one of c, d, t, f or g, i or h is other than 0;

e is 1 or 2;

$R_4$ is substituted or unsubstituted alkyl wherein permissible substituents are selected from the group consisting of alkyl, alkoxy, halo, phenyl, alkoxyphenyl, alkylphenyl, phenoxy, sulfophenoxy, haloalkyl, perhaloalkyl, alkoxyphenyl, alkylphenyl, alkylthio or alkylthioalkyl with the proviso that the total number of aliphatic carbon atoms included in $R_4$ is more than about seven carbon atoms and with the further proviso that $R_4$ includes at least one aliphatic moiety which includes at least five aliphatic carbons having an anionic moiety bonded to no more than one position;

$R_5$ is the same or different at each occurrence and is substituted or unsubstituted alkylphenyl, alkoxyphenyl or alkyl wherein permissible substituents are selected from the group consisting of alkyl, alkoxy, halo, phenyl, alkoxyphenyl, alkylphenyl, phenoxy, sulfophenoxy, haloalkyl, perhaloalkyl, alkoxyphenyl, alkylphenyl, alkylthio or alkylthioalkyl or any two $R_5$ substituents together may form an unsubstituted or substituted alkylene or alkenylene chain completing an aromatic or an alicyclic ring system wherein permissible substituents are as described above $R_5$ is a moiety of the formula:

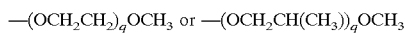

wherein:

q is a positive whole number from 6 to about 12, with the proviso that the total number of aliphatic carbon atoms included in $R_5$ is equal to or greater than thirteen and with the further proviso that $R_5$ includes at least one aliphatic moiety of at least five carbon atoms;

$R_6$ is hydrogen, alkyl, alkoxy or substituted or unsubstituted phenoxy, phenyl or phenylalkyl wherein permissible substitutients are alkyl, alkoxy or a combination thereof; and M is H⁺, or other metal or non-metal cation, with the proviso that at least one of M is H⁺ or a moiety which can be thermally or chemically transformed into a proton under use or process conditions.

In the most preferred embodiments of this invention, useful dopant solutes for doping the particles at or near its surface are those derived from acid dopants of the formula:

$$R_4(PO_2M)_t(SO_3M)_c(PO_3)_f$$
or

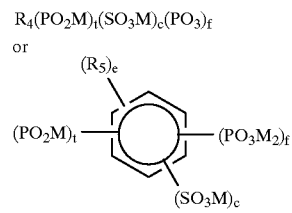

wherein:

c, f and t are the same or different and are 0, 1 or 2, with the proviso that at least one of c, f and t is not 0;

e is 1 or 2;

$R_4$ is alkyl or phenylalkyl, either unsubstituted or substituted with one or more phenoxy, sulfophenoxy or alkoxy substituents wherein the aliphatic moieties include at least about seven carbon atoms;

$R_5$ is the same are different at each occurrence and is alkyl, alkoxy, alkoxyalkyl, or phenylalkyl, either unsubstituted or substituted with one or more phenoxy, sulfophenoxy or alkoxy substituents or any two or more $R_5$ substituents together may form an alkylene or alkenylene chain completing an aliphatic or aromatic ring system which may be substituted with one or more alkyl, alkoxy, fluoro, phosphinic acid, phosphonic acid, phenylalkyl, alkylphenyl, alkoxyphenyl, (alkyl)(alkoxy) phenyl, fluoroalkyl, sulfonic acid, carboxylic acid, hydroxy, nitro, amino, cyano, or substituted or unsubstituted phenyl or phenylalkyl wherein permissible substituents are alkyl, alkoxy or a combination thereof; with the proviso that the total number of aliphatic carbon atoms included in $R_5$ is equal to or greater than fourteen and with the further proviso that $R_5$ includes at least one aliphatic moiety of at least seven carbon atoms; and M is H⁺ or other metal or non-metal cation, with the proviso that at least one of M is H⁺ or is a moiety which can be thermally transformed into a proton under use or process conditions.

In the especially preferred embodiments of this invention, useful dopant solutes for doping the particles at or near its surface are those derived from acid dopants of the formula:

$$R_4(SO_3M)_c$$
or

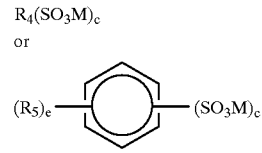

wherein:

c is 1, 2 or 3;

e is 1 or 2;

$R_4$ is alkyl having at least about seven carbon atoms (preferably from about seven carbon atoms to about twenty or thirty carbon atoms) or said alkyl substituted with one or more halo substituents, preferably fluoro;

$R_5$ is alkyl, alkoxy, alkoxyalkyl, phenylalkyl, phenyl, phenoxy or sulfophenoxy substituted with one or more alkyl, alkoxy or a combination thereof or any two $R_5$ substituents together may form an alkylene or alkenylene chain completeing an aromatic or alicyclic ring system which may be substituted with one or more alkyl, amino, hydroxy, fluoro, alkoxy, or alkoxyalkyl; with the proviso that the total number of aliphatic carbon atoms included in $R_5$ is greater than fourteen and with the further proviso that and $R_5$ includes at least one aliphatic moiety of at least seven carbon atoms; and M is H⁺ or other metal or non-metal cation or a moiety which can be thermally tranformed into a proton under process conditions.

In the process of the embodiment of this invention of choice, the dopant solutes for doping the particle at or near its surface are derived from sulfonic acid dopants of the formula:

$$R_4(SO_3M)_c$$
or

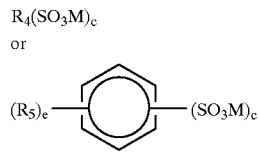

$(R_5)_e$ — — $(SO_3M)_c$ wherein;

$R_4$ is substituted or unsubstituted alkyl wherein permissible substituents are one or more fluoro groups, with the proviso that $R_4$ contains more than about seven aliphatic carbon atoms, preferably from about eight to about thirty carbon atoms, more preferably from about eight to about twenty-five carbon atoms and most preferably from about eight to about twenty carbon atoms;

e is 1 or 2;

c is 1 or 2;

$R_5$ is the same or different at each occurrence and is alkyl, either unsubstituted or substituted with one or more fluoro or sulfonic acid groups, or any two $R_5$ substituents together may form a divalent alkenylene chain completing a naphthalene ring, which ring substituted with one or two substituted or unsubstituted alkyl groups wherein permissible substituents as one or more fluoro or sulfonic acid groups; and M is a proton, or other metal or non-metal cation, with the proviso that at least one of M is proton.

For example, in the preferred embodiments of this invention, the surface dopant solute is derived from an alkane sulfonic acid wherein the number of aliphatic carbon atoms is from about 16 to about 30 (such as Aristal-L, Aristol-M, and Aristol-H available from Pilot Chemical Co.); or is a naphthalene sulfonic acid substituted by one or more alkyl wherein the total number of carbons is from about 16 to about 30 such as dinonylnaphthalene sulfonic acid; or is a disulfonated diphenyl ether substituted by one or more alkyl wherein the total number of carbon atoms is from about 16 to about 30 (such as the acid derivative of Dowfax™ 8390 available from Dow Chemical Co.)

The entire particle can be doped with the same aliphatic dopant solute which is at or near the surface of the particle or a combination of such aliphatic dopant solutes or a combination of one or more aliphatic dopant solutes and one or more other dopant solutes, or the particle can have a skin core dopant structure were the aliphatic dopant solute or combination of dopant solutes at or near the surface of the particle is different from the dopant solute or combination of dopant solutes at or near the core of said particle in terms of the type or types of dopants, in terms of differences in the relative amounts of dopant solutes in a combination of dopant solutes. In the preferred embodiments of the invention the particle has a skin-core dopant structure. In these preferred embodiments of the invention, the major portion (greater than 50%) of the critical aliphatic dopant solute may be in the region at or near the surface of the particle or this region may include smaller amounts of the critical dopant solute. In other of these preferred embodiments of the invention, the relative concentration of the critical aliphatic dopant solute can be described as a concentration gradient in which the greatest concentration of the aliphatic dopant solute is in the region at or near the surface of the particle, with the highest concentration per unit volume being at the surface; and the lowest concentration per unit volume is in the region at or near the core of the particle, with the very lowest concentration per unit volume being at the very center of the particle. This degree of structure provides for an increase in the effectiveness of the particles under use conditions. For example, particles of electrically conductive polmers having relatively high conductivity and dispersibility are sought for dispersion in thermoplastics, such as polyesters as for example poly(ethylene terephthalate), poly (butylene terephthalate), poly(ethylene terephthalate glycol) and the like; polyamides such as nylon 6, nylon 66, and the like; polyolefins such as poly(ethylene) and poly (propylene); polycarbonates; poly(phenylene oxides); and the like. When such blends are used, for example, to provide electromagnetic interference (EMI) shielding, a blend conductivity greater than about 0.1 S/cm is usually required and a blend conductivity of greater than 1.0 S/cm is preferred. Uniform distribution of particles is sought to prevent gaps in the shield. Surfaces and corners in molded articles typically present difficulties for achieving sufficiently uniform distribution of particles. The present invention provides means for achieving the desired properties of the blend by providing conductive particles which by virtue of their multilayer structure preferably combine the requirements for relatively high compatibility and conductivity.

Other dopants for use in the practice of this invention can vary widely and can be such materials which are known in the art for use in doping conjugated backbone polymers to form conductive or semi-conductive polymers, as for example, those described in detail in EP 0017717; U.S. Pat. Nos. 3,963,498, 4,025,463, 4,855,361, 4,806,271, 4,822, 638, 4,851,487, 4,798,685, 5,006,278, 5,069,820 and 5,061, 401; and WO89/01694 and WO90110297.

Illustrative of other useful dopants for use in the practice of this invention as for example for forming the dopant solute at the core of the particle are oxidizing dopants. Oxidizing dopants are well known in the conductive polymer art, and any of such known oxidizing dopants can be used. Illustrative of useful oxidizing dopants are $AsF_5$, $MoOCl_4$, $MoCl_5$, $PCl_5$, $POCl_3$, $PCl_3$, $AlCl_3$, $NO^+$ and $NO_2^+$ salts (such as $NOBF_4$, $NOPF_6$, $NOSbF_6$, $NOAsF_6$, $NOCH_3CO_2$, $NO_2BF_4$, $NO_2PF_6$, $NO_2AsF_6$, $NO_2SbF_6$, and $NO_2CF_3SO_3$), $HClO_4$, $HNO_3$, $H_2SO_4$, benzoylperoxide, $SO_3$, $Br_2$, $(FSO_3)_2$, $CuCl_2$, $FSO_3H$, and Fe(III) salts (such as $Fe(BF_4)_3$, $FeBr_3$, $Fe(CH_3SO_3)_3$, $Fe(ClO_4)_3$, $FeCl_3$, $Fe(OTs)_3$ wherein $OTs^-$ is tosylate $(CH_3(C_6H_4)SO_3^-)$, and $Fe(CF_3SO_3)_3$ which give rise to doped polymers containing dopant solutes such as $NO_3^-$, $CH_3SO_3^-$, $AlCl_4^-$, $BF_4^-$, $CuCl_3^-$, $PCl_4^-$, $PF_6^-$, $AsF_6^-$, $SbF_6^-$, $CF_3SO_3^-$, $ClO_4^-$, $OTs^-$, $SO_3^{-2}$, $C_6H_5CO_2^-$, $CH_3SO_3^-$, $FSO_3^-$, and $FeCl_4^-$. Other useful oxidizing dopants include oxidizing salts such as $LiClO_4$, $AgOTs$, $NaClO_3$, $Bu_4NClO_4$ (where Bu is Butyl) and the like. Still other useful dopants include non-oxidizing salts such as $Bu_4NOTs$, $Bu_4NCF_3SO_3$, $LiCF_3SO_3$, $NaC_6H_4(SO_3)_2$, and the like in combination with an oxidant such as ammonium persulfate, $H_2O_2$, halogen, oxygen, TCNQ, TCNE, DDQ, and the like. Preferred oxidizing dopants for use in the practice of this invention are oxidizing dopants selected from the group consisting of Cu(II), Fe (III), $NO^+$, or $NO_2^+$ salts of organic sulfonates or phosphonates such as $Fe(CH_3SO_3)_3$ or NOOTs or and particularly preferred oxidizing dopants for use in the practice of this invention are Fe(III) salts of organic sulfonates or phosphonates. Amongst these particularly preferred embodiments, most preferred oxidizing dopants are Fe(III) salts of organic sulfonates.

Useful other dopant solutes as for example those for use at or near the core of the particle may also be derived from protonic acid dopants. Illustrative of such protonic acid dopants are inorganic oxidizing or non-oxidizing protonic acid dopants. Such dopants include inorganic acid such as hydrofluoric acid, fluorosulfonic acid, hydrochloric acid, hydroiodic acid, phosphoric acid, nitric acid, perchloric acid, fluoroboric acid, boric acid, sulfuric acid and the like.

Illustrative of still useful other dopants as for example those for use at or near the core of protonic acid dopants are organic non-oxidizing protonic acids such as those forming dopant solutes of the formula:

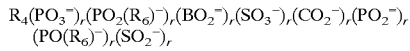

$R_4(PO_3^-)_r(PO_2(R_6)^-)_r(BO_2^-)_r(SO_3^-)_r(CO_2^-)_r(PO_2^-)_r(PO(R_6)^-)_r(SO_2^-)_r$ and having one or more cationic moieties selected from the group consisting of:

$M^{+n}$ wherein:

$R_4$ and $R_6$ are the same or different at each occurrence and are organic radical or amino;

M is a species having a positive charge equal to n, provided that at least one of $M^{+n}$ is a proton or a moiety which can be transformed by radiation, heat, chemicals and the like into a proton under use conditions such as $NH_4^+$, $N(CH_3)_2H_2^+$, $N(C_2H_5)H_3^+$, $Ph_3S^+$ and the like;

n is the same or different at each occurrence and is an integer equal to 1 to 8;

r is the same or different at each occurrence and is 0 or a positive integer equal to or greater than 1, with the proviso that at least one of r is other than 0.

The $R_4$ and $R_6$ group may vary widely and can be a substituted or unsubstituted aliphatic, cycloaliphatic or heterocycloaliphatic radical such as alkyl, nitroalkyl, haloalkyl and the like, or a substituted or unsubstituted aromatic radical such as phenyl, halophenyl, nitrophenyl, anthracyl, naphthyl, phenanthryl and the like. $R_4$ and $R_6$ groups may also be a polymeric radical such as a polymer having recurring pendant phenyl groups in the polymeric backbone substituted with sulfonic acid, sulfinic acid, phosphonic acid, phosphinic acid, phosphoric acid, carboxylic acid, boric acid, or the salts or esters thereof; moieties such as sulfonated or phosphonated polystyrene, poly(2-methylstyrene), poly(4-phenylstyrene), poly(2-vinyl naphthalene), poly(vinyl benzoate), poly(benzyl methacrylate) and the like. In the particularly preferred embodiments of the invention, $R_4$ and $R_6$ are aromatic radical and in the most preferred embodiments $R_4$ and $R_6$ are substituted or unsubstituted phenyl or naphthyl. Illustrative of still other useful non-oxidizing protonic acid dopants are those forming dopant solutes of the formula:

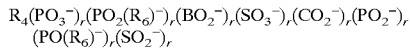

$R_4(PO_3^-)_r(PO_2(R_6)^-)_r(BO_2^-)_r(SO_3^-)_r(CO_2^-)_r(PO_2^-)_r(PO(R_6)^-)_r(SO_2^-)_r$ and having one or more cationic moieties selected from the group consisting of:

$M^{+n}$ wherein:

$R_4$ and $R_6$ are the same or different at each occurrence and are organic or inorganic radical or amino;

$M^{+n}$ is a species having a positive charge equal to n, provided that at least one of $M^{+8}$ is a proton or a moiety which can be transformed by radiation, heat, chemicals and the like, into a proton under use conditions such as $NH_4^+$, $N(CH_3)_2H_2^+$, $N(C_2H_5)H_3^+$, $Ph_3S^+$, and the like;

n is the same or different at each occurrence and is an integer equal to 1 to 8;

r is the same or different at each occurrence and is 0 or a positive integer equal to or greater than 1, with the proviso that at least one of r is other than 0.

Such acids include 1-anthracene sulfonic acid, oxalic acid, 9-anthracene sulfonic acid, tartaric acid, 2-phenanthrene sulfonic acid, malonic acid, 3-phenanthrene sulfonic acid, succinic acid, 9-phenanthrene sulfonic acid, glutaric acid, adipic acid, trifluoromethane sulfonic acid, pimelic acid, perflourooctyl sulfonic acid, azelaic acid, perfluorooctyl carboxylic acid, sebacic acid, octyl sulfonic acid, phthalic acid, dodecyl sulfonic acid, isophthalic, cetyl sulfonic acid, terephthalic, toluene sulfonic acid, methyl phosphinic acid, dimethyl phosphinic acid, phenyl phosphonic acid, dodecylbenzene sulfonic acid, naphthalene sulfonic acid, benzene disulfonic acid, benzene sulfonic acid, 1,3-benzene disulfonic acid, 2,5-dihydroxy-1,4-benzene disulfonic acid, camphor sulfinic acid, naphthalene trisulfonic acid, ethylbenzene sulfonic acid, ethane sulfonic acid 1,5-naphthalene disulfonic acid, nickel phthalocyanine tetrasulfonic acid, phenyl phosphonic acid, diphenyl phosphinic acid, phenyl phosphinic acid, ortho boric acid, 3-sulfopropyl acrylate, meta boric acid, 3-sulfopropyl methacrylate, sulfamic acid, 5-sulfosalicyclic acid, trion (4,5-dihydroxy-1,3 - benzene disulfonic acid), vinyl sulfonic acid, arsenic acid, arsenous acid, arsinic acid, arsonic acid, sulfanilic acid, 4-sulfophthalic acid, sulfoacetic acid, methyl phosphinic acid, phenylphosphonic acid, methyl phosphonic acid, poly (2-vinyl naphthalene), naphthol yellow, naphthol blue black, 1,2-naphthoquinone-4-sulfonic acid, naphthylazoxine S, 1-octane sulfonic acid and the like.

Dopants which are most preferred for use at or near the core of the conductive polyaniline particles of this invention when the purpose is to achieve high conductivity include but are not limited to methane sulfonic acid, propane sulfonic acid, trifluoromethane sulfonic acid, p-toluene sulfonic acid, 4-hydroxybenzene sulfonic acid, benzene sulfonic acid, sulfuric acid and trifluoroacetic acid.

The amount of dopant added to the polyaniline at or near the surface of the particle or at or near the core of the particle is not critical and may vary widely. In general, sufficient dopant is added to the polyaniline such that the conductivity is at least about $10^{-8}$ $ohm^{-1}cm^{-1}$. The upper level of conductivity is not critical and will usually depend on the type of aniline polymer employed and the dopant. In general, the highest level of conductivity that can be obtained is provided without unduly adversely affecting the environmental stability of the polyaniline. In the preferred embodiments of the invention, the amount of dopant employed is sufficient to provide a conductivity of at least about $10^{-6}$ $ohm^{-1}cm^{-1}$ and in the particularly preferred embodiments is sufficient to provide a conductivity of from about $10^{-4}$ $ohm^{-1}cm^{-1}$ to about $10^{+3}$ $ohm^{-1}cm^{-1}$. Amongst these particularly preferred embodiments, most preferred are those embodiments in which sufficient dopant is employed to provide a conductivity of at least about $10^{-3} ohm^{-1}cm^{-1}$ 1 to about $10^{+3}$ $ohm^{-1}cm^{-1}$, with amounts sufficient to provide a conductivity from about $10^0$ $ohm^{-1}cm^{-1}$ to about $10^{+3}$ $ohm^{-1}cm^{-1}$ usually being the amounts of choice.

The polyaniline particles of this invention are also expected to show an increased effectiveness for their dispersibility in common organic liquids, such as, for example, alcohols, ketones, alkanes, sulfoxides, sulfides, and amides.

Similarly, the present invention provides a means of providing dispersible particles of a desirable size, geometry, and surface area. Such particles are generally produced by a nucleation and growth process within the reaction mixture. The size, shape, and surface area of such particles is known by those of skill in the art to be a function of reaction conditions especially including the chemical composition of the dopant which is typically present during the synthesis of the polyaniline. In the preferred embodiments of the invention, the size of at least about 10% of the particles is preferably less than the wavelength of light e.g. less than 400 nm, so that optically clear blends of the pacticles can be obtained. Preferably the particle size of at least about 30% of the particles is less than about 400 nm, more preferably the particle size of at least about 50% of the particles is less than about 400 nm and most preferably at least about 75% of the particles is less than about 400 nm. The present invention allows for the optimal choice of dopant for this purpose since the other required characteristics, such as compatibility with the matrix polymer or liquid medium can be added or enhanced in a post synthesis step via a controlled exchange of dopant(s) in the surface regions of the particles.

The particles may include various other optional ingredients. For example, salts containing dopant anions, plasticizers, or dispersion aids.

The particles of this invention can be manufactured using modification of conventional chemical or electrochemical doping procedures such as those of U.S Pat. No. 4,820,595 relating to polyaniline which is hereby incorporated by reference. For example, particles of polyaniline can be prepared by addition of an oxidant to solutions of the aniline monomer. The dopant anion incorporated in the polyaniline may be derived from the oxidant (e.g. $FeCl_4^-$ from $FeCl_3$) or it may be derived from an acid or salt which is also present in the solution (e.g., $CH_3(C_6H_4)SO_3^-$ when tosylic acid is present) during addition of an oxidant such as ammonium persulfate. Such conventional procedures produce doped conductive polyaniline particles and particle aggregates which are, in general, homogeneously doped with a dopant or mixture of dopants. In the present invention, such dopants or mixtures of dopants form the core of the conductive polyanilines particles. When a structured dopant distribution is desired, the outer layer or layers of the particles of this invention which contain dopant produced either during synthesis or after synthesis is totally or partially replaced by the dopant of this invention by dopant exchange or by partial dopant removal and replacement. It is possible to achieve a stratified dopant configuration by using an excess of a different salt or acid during the latter stages of the polymerization reaction or during the washing procedure after polymerization. Alternatively, the particles may be filtered and washed with water or other solvent after the synthesis to remove any free salt or acid of the first core dopant type or depending on the degree of washing to remove a surface layer of the core dopant from each particle. A dopant layer of different composition can be then be achieved by washing or slurrying the polymer particles in a solution of the new dopant. Repeated washing with different dopants will produce multiple layers. It is preferred that primary particles rather than aggregates receive a core/shell dopant structure. It is preferred that the aqueous or nonaqueous solvent or solvent mixture employed in the procedure act to swell the polyaniline particles. It is also preferred that the entire precedure from synthesis through to the formation of a layered dopant structure be carried out while keeping the polyaniline particles wetted by a liquid which swells the polyaniline.

When highly dispersible polyaniline particles are desired and there are no requirements for a different core dopant, then the dopants of this invention containing long-chain aliphatic moieties with more than 12 carbon atoms when bonded to aromatic moieties and more than 6 when bonded to aliphatic moieties can be employed both during the synthesis and the washing procedure to produce a particle with a single dopant. In other instances, two dopants may be employed together as a mixture during the synthesis and washing procedure provided that at least one of said dopants contains at least about 12 aliphatic carbon atoms when bonded to aromatic moieties and more than about 6 aliphatic carbon atoms when bonded to aliphatic moieties. Depending on the choice of said dopants a uniform mixture of dopants may be obtained within the particle or one of the dopants may predominate on the surface of said particle. It is preferred that the dopant containing more than about 6 aliphatic carbons predominate on the surface of the particles in order to best promote dispersibility in the matrix.

The electrically conductive polyaniline composition of this invention can be used for any purpose for which conductive polymers are useful. For example, the composition can be used to form electrically conductive articles for shielding purposes, anti-static purposes or adhesives. Examples of articles include conductive polymer housings for EMI shielding of sensitive electronic equipment such as microprocessors, infrared, radio frequency and microwave absorbing shields, flexible electrically conducting connectors, conductive bearings, brushes and semiconducting photoconductor junctions, electrodes, capacitors, optically transparent or non-transparent corrosion-preventing coatings for corrodible materials such as steel, antistatic materials and optically transparent or non-transparent conductive coatings for packaging electronic components, antistatic carpet fibers, waxes for floors in computer rooms, antistatic finishes for CRT screens, aircraft, auto windows, electostatic dissipative packaging for electronics, and the like.

The particles of this invention are particularly suited for use in the manufacture of liquid emulsions and suspensions of the polyaniline in a liquid, and blends and solid solutions of the polyaniline with other polymers as for example, other conjugated backbone polymers, thermoplastic polymers such as polyamides, polycarbonates, polyesters, polylactones, polyolefins, polyacrylics, polyimides, poly (esterimides), poly(estercarbonates), poly(etherimides), and the like; thermosetting resins such as phenolics and phenolic derivatives, alkyds, unsaturated polyester, epoxies, melamines, amino resins and allylics; and mixtures thereof. In the preferred embodiments of the invention, the size of at least about 10% of the particles in the matrix liquid or polymer is preferably less than the wavelength of light e.g. less than 400 nm, so that optically clear blends of the particles can be obtained. The particle size of the particles in the liquid or polymer matrix may vary widely. Preferably the particle size of at least about 30% of the particles in the matrix liquid or polymer is less than about 400 nm, more preferably the particle size of at least about 50% of the particles in the matrix liquid or polymer is less than about 400 nm and most preferably at least about 75% of the particles in the matrix liquid or polymer is less than about 400 nm. For example, blends of conductive polyaniline particles which are inherently highly polar may be made with a polymer such as poly(ethylene terephthalate glycol) (PETG) or polycarbonate (PC) by combining a core dopant such as tosylate ($CH_3(C_6H_4)SO_3^-$), which offers high conductivity with a surface dopant such as dinonyl(naphthalene sulfonic acid), didodecyldiphenylether disulfonic acid, or didecyldiphenylether disulfonic acid which offers increased compatibility with PETG or PC via the long-chain alkyl substituent on the dopant anion.

The following specific examples are presented to more particularly illustrate the invention, and should not be construed as being limitations on the scope and spirit of the invention.

EXAMPLE 1

Polyaniline tosylate (PAni-OTs) was prepared from aniline, p-toluene sulfonic acid (PTSA), and ammonium persulfate solution by first combining the aniline and the acid, and then slowly adding the ammonium persulfate solution to the acid and aniline solution in approximately one hour. The solids which were formed were then filtered and washed successively twice with water (75° C.), once with 5% solution of PTSA (slurry for 1 to 2 hrs), and finally with a 2% solution of PTSA in methanol. After filtration, the solids were dried in a vacuum oven at 130° C. until the temperature of the powdered solids reached 110° C. The water content of the solids was determined to be less than 3% by weight.

EXAMPLES 2 TO 7 AND COMPARISON EXAMPLE 1

Polyaniline tosylate was prepared as in Example 1. This polyaniline was slurried in a wash containing from 2 to 4 percent by weight of a compatibilizing dopant, and then filtered and dried in a fluid-bed drier. The compatibilization doping agents employed were decyldiphenylether disulfonic acid (Dowfax™3BO), dinonylnaphthalene sulfonic acid (DNN), linear $C_{10}$-substituted diphenyl ether disulfonic acid (CF10LA) (CALFAX 10LA-40 obtained from Pilot Chemical Co.) and long-chain alkane sulfonic acids (Aristol-M (molecular weight 450) and Aristol-H (molecular weight 500)) obtained from Pilot Chemical Co. Corporation.

This polyaniline was blended in poly(ethylene terephthalate glycol), PETG, at 190° C. in a Brabender™ mixer beginning at a concentration of 40 percent by weight. This mixture was successively diluted to lower concentrations of polyaniline by withdrawing samples of the blend and replacing the withdrawn sample by an equivalent weight of PETG. The samples of the polyaniline/PETG blend were then compression molded (Hot-pressed) to form thin sheets. The conductivity of the sheets was then measured by means of a four probe apparatus consisting of a square array of probes spaced 1-cm apart.

The conductivity as a function of the concentration of polyaniline in volume percent determines a percolation curve for the blend. The critical concentration for percolation (i.e., the formation of continuous three dimensional pathways for electronic conduction) is theoretically associated with the point of steepest rise in a plot of the logarithm of conductivity vs the percentage of loading volume of the conductive filler. An example of such curves is shown in FIG. 1 which compares the results for polyaniline tosylate (PAni OTs) with those for two compatibilized compositions having a core/skin dopant arrangement on polyaniline particles, PAni OTs/DBS and PAni OTs/AS-H. Since the inflexion point is difficult to determine directly from the plot, we have used the fact that for a random distribution of particles the conductivity above the percolation point is expected to follow a relation of the form, $\sigma=\sigma_o(\sigma-\sigma_c)^\tau$, where $\sigma$ is conductivity, $\sigma$ is the fractional loading of the conductive component in the insulating matrix, $\sigma_c$ is the critical loading for percolation, i.e., the percolation point and $\sigma_0$ and $\tau$ are constants. The parameters, $\sigma_c$, $\sigma_0$ and $\tau$ are determined by a numerical fit to the data. The results of such a fit is shown for three separate cases in FIG. 1 as the smooth curves. The data obtained for various samples with different compatibilizers is summarized in Table 1. Also listed are the data for saturation conductivity ($\sigma_{sat}$) and for the conductivity at an intermediate loading level (18.5 volume percent, $\sigma_{18.5}$).

TABLE 1

Polyaniline compositions with Compatibilizing Skin Dopants

| Ex. No. | Composition | $\delta_c \times 100\%$ (vol %) | $\sigma$sat* (S/cm) | $\sigma18.5$† (S/cm) |
|---|---|---|---|---|
| Comp. Ex. 1 | PAni OTs | 8.80 | 2.9 | 0.075 |
| Ex. 2 | PAni OTS/DBS | 6.77 | 3.2 | 0.21 |
| Ex. 3 | PAni OTs/3BO | 8.06 | 2.2 | 0.78 |
| Ex. 4 | PAni OTs/DNN | 6.44 | 1.3 | 0.017 |
| Ex. 5 | PAni OTs/CF10LA | 7.61 | 2.0 | 0.085 |
| Ex. 6 | PAni OTs/AS-M | 6.14 | 2.7 | 0.23 |
| Ex. 7 | PAni OTs/AS-H | 6.18 | 2.8 | 0.32 |

*Saturation Conductivity (taken to be conductivity at 40 vol %)
†Conductivity at 18.5 vol %
OTs - Tosylate
3BO - Decyldiphenyl ether disulfonate (DOWFAX 3BO)
DNN - Dinonylnaphthalene sulfonate
CF10LA - Linear $C_{10}$ substituted diphenyl ether disulfonate (CALFAX 10LA-40)
AS-M - Alkane sulfonate (Aristol-M, MW = 450)
AS-H - Alkane sulfonate (Aristol-H, MW = 500)

In general it is desirable for the percolation point to be as low as possible and the conductivity at 18.5 vol % to be as high as possible, since one desires to obtain the highest conductivity at the lowest loading. The single most important parameter is the conductivity at the intermediate doping level, since such a point represents a practical compromise between obtaining high conductivity (for which the highest loading is desired) and the best mechanical properties for the blend (for which the lowest loading level is desired). On this basis the sample treated with Dowfax™ 3BO is the best followed by that treated with Aristol-H.

What is claimed is:

1. An electrically conductive particle comprising an ionized electrically conductive conjugated polymer doped with two or more dopant solutes having one or more anionic moieties, at least one of said dopants predominating at or near the surface of said particle and at least one other dopant predominating at or near the core of said particle, wherein the at least one of said dopant solutes predominating at or near the surface is an aliphatic dopant solute having about 16 to about 30 carbon atoms.

2. A particle according to claim 1 wherein said aliphatic dopant solute has a molecular weight equal to or less than 2000.

3. A particle according to claim 2 wherein said conjugated polymer is a conjugated backbone homopolymer or copolymer.

4. A particle according to claim 3 wherein said conjugated backbone homopolymer or copolymer is a substituted or unsubstituted polyaniline.

5. A particle according to claim 4 wherein said polyaniline is of the type derived from polymerizing an aniline of the Formula I:

Formula I

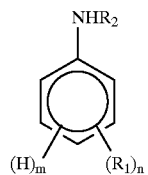

or is a derivative of polyaniline of the type derived from polymerizing said aniline, wherein:

n is an integer from 0 to 5;

m is an integer from 0 to 5, with the proviso that the sum of n and m is 5 and with the further proviso that the aniline ring is substituted with a substituent which will allow coupling of the aniline groups to form the polyaniline;

$R_1$ is phosphinic acid or a salt or ester thereof, phosphonic acid or a salt or ester thereof, sulfonic acid, boric acid or a salt or ester thereof, phosphoric acid, alkylamino, dialkylamino, arylamino, diarylamino, alkylarylamino, amino, hydroxy, sulfinic acid, nitro, carboxylic acid or a salt or ester thereof, halo, cyano, deuterium, or substituted or unsubstituted alkyl, alkenyl, alkoxy, cycloalkyl, cycloalkenyl, alkanoyl, alkylthio, alkynyl, dialkylamino, arylamino, diarylamino, alkylarylamino, aryloxy, hydroxy, alkylthioalkyl, alkylaryl, arylalkyl, aryloxy, amino, alkylthioalkyl, alkylaryl, arylalkyl, alkylsufinyl, alkoxyalkyl, alkylsulfonyl, aryl, arylthio, arylsulfinyl, alkoxycarbonyl, alkylsilane, or arylsulfonyl, wherein permissible substituents are one or more amino, alkylamino, dialkylamino, arylamino, diarylamino, phosphinic acid salt or ester thereof, alkylarylamino, phosphonic acid salt or ester thereof, sulfonic acid salt or ester thereof, boric acid salt or ester thereof, sulfinic acid salt or ester thereof, phosphoric acid salt or ester thereof, carboxylic acid salt or ester thereof, halo, nitro, hydroxy, cyano or epoxy moieties; or any two $R_1$ substituents or any one $R_1$ substituent and $R_2$ substituent taken together may form substituted or unsubstitued alkylene, alkynylene or alkenylene chain completing a 3, 4, 5, 6, 7, 8, 9 or 10 membered aromatic, heteroalicyclic, heteroaromatic or alicyclic carbon ring, which ring may optionally include one or more divalent ester, carbonyl, nitrogen, sulfur, sulfinyl, sulfonyl or oxygen, wherein permissible substituents are one or more amino, alkylamino, phosphinic acid salt or ester thereof, dialkylamino, arylamino, diarylamino, alkylarylamino, phosphonic acid salt or ester thereof, sulfonic acid salt or ester thereof, boric acid salt or ester thereof, sulfinic acid salt or ester thereof, phosphoric acid salt or ester thereof, carboxylic acid salt or ester thereof, halo, nitro, hydroxy, cyano or epoxy moieties, or $R_3$ is an aliphatic moiety having repeat units of the formula:

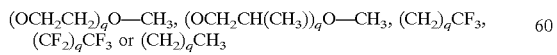

wherein q is a positive whole number; and $R_2$ is the same or different at each occurrence and is $R_1$ substituents or hydrogen.

6. A particle according to claim 5 wherein the polyaniline comprises repeat units of the Formulas II and III:

Formula II

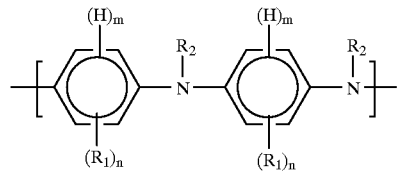

Formula III

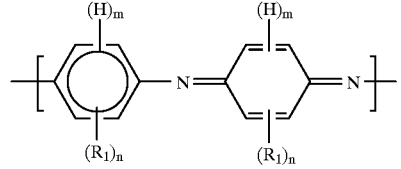

or a combination thereof, wherein:

n and m are the same or different at each occurrence and are integers from 0 to 4, with the proviso that the sum of n and m is 4;

$R_1$ is phosphinic acid or a salt or ester thereof, phosphonic acid or a salt or ester thereof, sulfonic acid or a salt or ester thereof, boric acid or a salt or ester thereof, phosphoric acid or a salt or ester thereof, alkylamino, dialkylamino, arylamino, diarylamino, alkylarylamino, amino, hydroxy, sulfinic acid or a salt or ester thereof, nitro, carboxylic acid or a salt or ester thereof, halo, cyano, deuterium, or substituted or unsubstituted alkyl, alkenyl, alkoxy, cycloalkyl, cycloalkenyl, alkanoyl, alkylthio, alkynyl, dialkylamino, arylamino, diarylamino, alkylarylamino, aryloxy, hydroxy, alkylthioalkyl, alkylaryl, arylalkyl, aryloxy, amino, alkylthioalkyl, alkylaryl, arylalkyl, alkylsufinyl, alkoxyalkyl, alkylsulfonyl, aryl, arylthio, arylsulfinyl, alkoxycarbonyl, alkylsilane, or arylsulfonyl, wherein permissible substituents are one or more amino, alkylamino, dialkylamino, arylamino, diarylamino, phosphinic acid or a salt or ester thereof, alkylarylamino, phosphonic acid or a salt or ester thereof, sulfonic acid or a salt or ester thereof, boric acid or a salt or ester thereof, sulfinic acid or a salt or ester thereof, phosphoric acid or a salt or ester thereof, carboxylic acid or a salt or ester thereof, halo, nitro, hydroxy, cyano or epoxy moieties; or any two $R_1$ substituents or any one $R_1$ substituent and $R_2$ substituent taken together may form substituted or unsubstitued alkylene, alkynylene or alkenylene chain completing a 3, 4, 5, 6, 7, 8, 9 or 10 membered aromatic, heteroalicyclic, heteroaromatic or alicyclic carbon ring, which ring may optionally include one or more divalent ester, carbonyl, nitrogen, sulfur, sulfinyl, sulfonyl or oxygen, wherein permissible substituents are one or more amino, alkylamino, phosphinic acid or a salt or ester thereof, dialkylamino, arylamino, diarylamino, alkylarylamino, phosphonic acid or a salt or ester thereof, sulfonic acid or a salt or ester thereof, boric acid or a salt or ester thereof, sulfinic acid or a salt or ester thereof, phosphoric acid or a salt or ester thereof, carboxylic acid or a salt or ester thereof, halo, nitro, hydroxy, cyano or epoxy moieties, or $R_1$ is an aliphatic moiety having repeat units of the formula:

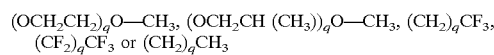

wherein q is a positive whole number; and $R_2$ is the same or different at each occurrence and is $R_1$ substituents or hydrogen.

7. A particle according to claim 6 wherein said homopolymer or copolymer is comprised of the Formula IV:

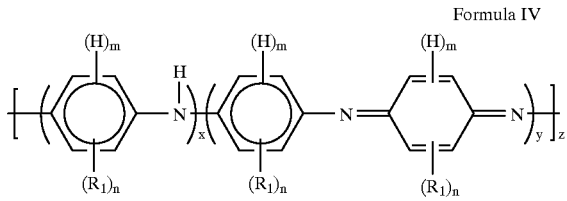

Formula IV wherein:
x and y are the same or different at each occurrence and are integers equal to or greater than 0, with the proviso that the sum of x and y is greater than 0; and
z is the same or different at each occurrence and is an integer equal to or greater than about 5.

8. The particle according to claim 7 wherein x is an integer equal to or greater than 0 and/or the ratio of x to y is greater than or equal to 0.

9. A particle according to claim 8 wherein:
n is an integer from 0 or 1;
m is an integer from 3 or 4, with the proviso that the sum of n and m is equal to 4;
$R_1$ is phenyl, or alkyl or alkoxy having from 1 to about 12 carbon atoms, a protonic acid function or a salt or ester thereof, or alkyl, phenyl or alkoxy substituted with one more or protonic acids or salts or esters thereof;
x is an integer equal to or greater than 1;
y is equal to or greater than 0, with the proviso that the ratio of x to y is equal to or greater than 0.5; and
z is an integer equal to or greater than about 5.

10. A particle according to claim 9 wherein:
n is an integer from 0 or 1;
m is an integer from 3 or 4 with the proviso that the sum of n and m is equal to 4;
$R_1$ is alkyl, or alkoxy having from 1 to about 6 carbon carboxylic acid or salts or esters thereof, phosphinic acid or salts or esters thereof, sulfonic acid or salts or esters thereof, sulfinic acid or salts or esters thereof, phosphonic acid or salts or esters thereof, or alkyl or alkoxy substituted with phosphinic acid or salts or esters thereof, sulfinic acid or salts or esters thereof, halo, phosphonic acid or salts or esters thereof, phosphoric acid or salts or esters thereof, or sulfonic acid or salts or esters thereof;
x is an integer equal to or greater than 2;
y is equal to or greater than 0, with the proviso that the ratio of x to y is greater than about 1; and
z is an integer equal to or greater than about 10.

11. A particle according to claim 10 wherein:
n is an integer from 0 or 1;
m is an integer from 3 or 4, with the proviso that the sum of n and m is equal to 4;
$R_1$ is alkoxy or alkyl of from 1 to about 6 carbon atoms, sulfonic acid or salts thereof, phosphoric acid or salts thereof, or phosphonic acid or salts thereof;
x is an integer equal to or greater than 2;
y is an integer equal to or greater than 1; and
z is an integer equal to or greater than about 10.

12. A particle according to claim 11 wherein:
n is 0;
m is 4;

x is an integer equal to about 2;
y is an integer equal to about 1, with the proviso that the ratio of x to y is equal to or greater than about 2; and
z is an integer equal to or greater than about 10.

13. A particle according to claim 5 wherein said at least one other dopant predominating at or near said core of said particle has the formula:

$$R_4(P_2^-)_r(SO_2^-)_r(PO_2(R_6)^-)_r(SO_3^-)_r(PO_2^-M)_r(PO(R_6)^-)_r$$

wherein $R_4$ is an organic radical, $R_6$ is hydrogen or an organic radical; and r is 0 or an integer from 1 to 8, with the proviso that at least one of r is not zero.

14. A particle according to claim 13 wherein said other dopant predominating at or near said core of said particle has the formula:

$$R_4(SO_3^-)_r$$

wherein r is 1, 2 or 3; and $R_4$ is an organic radical.

15. A particle according to claim 14 wherein $R_4$ is alkyl, alkyl substituted with one or more fluoro groups, naphthyl, phenyl, naphthyl or phenyl substituted with one or more alkyl or hydroxy groups.

16. A particle according to claim 5 wherein said aliphatic dopant solute at or near the surface of said particle is of the formula:

$$R_4(PO_3^-)_r(PO_2^-)_r(SO_2^-)_r(PO_2(R_6)^-)_r(SO_3^-)_r(CO_2^-)_r$$
$$(PO(R_6)^-)_r(BO_2^-)_r(PO_3^-M)_r(PO_2^-M)_r(PO_2^-M)_r(BO_2^-M)_r$$

having a cationic moiety or moieties of the formula $M^{+n}$ wherein:
$R_4$ is an organic radical, with the proviso that the total number of aliphatic carbon atoms included in $R_4$ is from about 16 to about 30;
r is an integer of 1 to 8;
$M^{+n}$ is a cationic species;
n is an integer of 1 to 8;
$R_6$ is hydrogen or alkyl.

17. A particle according to claim 16 wherein said aliphatic dopant solute at or near the surface of said particle is derived from an alkane sulfonic acid.

18. A polymer blend comprising a matrix which comprises one or more thermosetting polymers, one more thermoplastic polymers or blends thereof having dispersed therein an electrically conductive effective amount of electrically particles comprising an ionized electrically conductive conjugated polymer doped with two or more dopant solutes having one or more anionic moieties, at least one of said dopants predominating at or near the surface of said particle and at least one other dopant predominating at or near the core of said particle, wherein the at least one of said dopant solutes predominating at or near the surface is an aliphatic dopant solute having about 16 to about 30 carbon atoms.

19. The polymer blend according to claim 18, wherein the ionized electrically conductive conjugated polymer is a substituted or unsubstituted polyaniline.

20. The polymer blend according to claim 19, wherein the aliphatic dopant solute at or near the surface of said particle is derived from an alkane sulfonic acid.

* * * * *